Sept. 22, 1936.  C. G. CURTIS  2,055,338

TWO-CYCLE INTERNAL COMBUSTION ENGINE

Filed April 14, 1931   2 Sheets-Sheet 1

Charles G. Curtis  INVENTOR
BY
Gustav C. Thompson  ATTORNEY

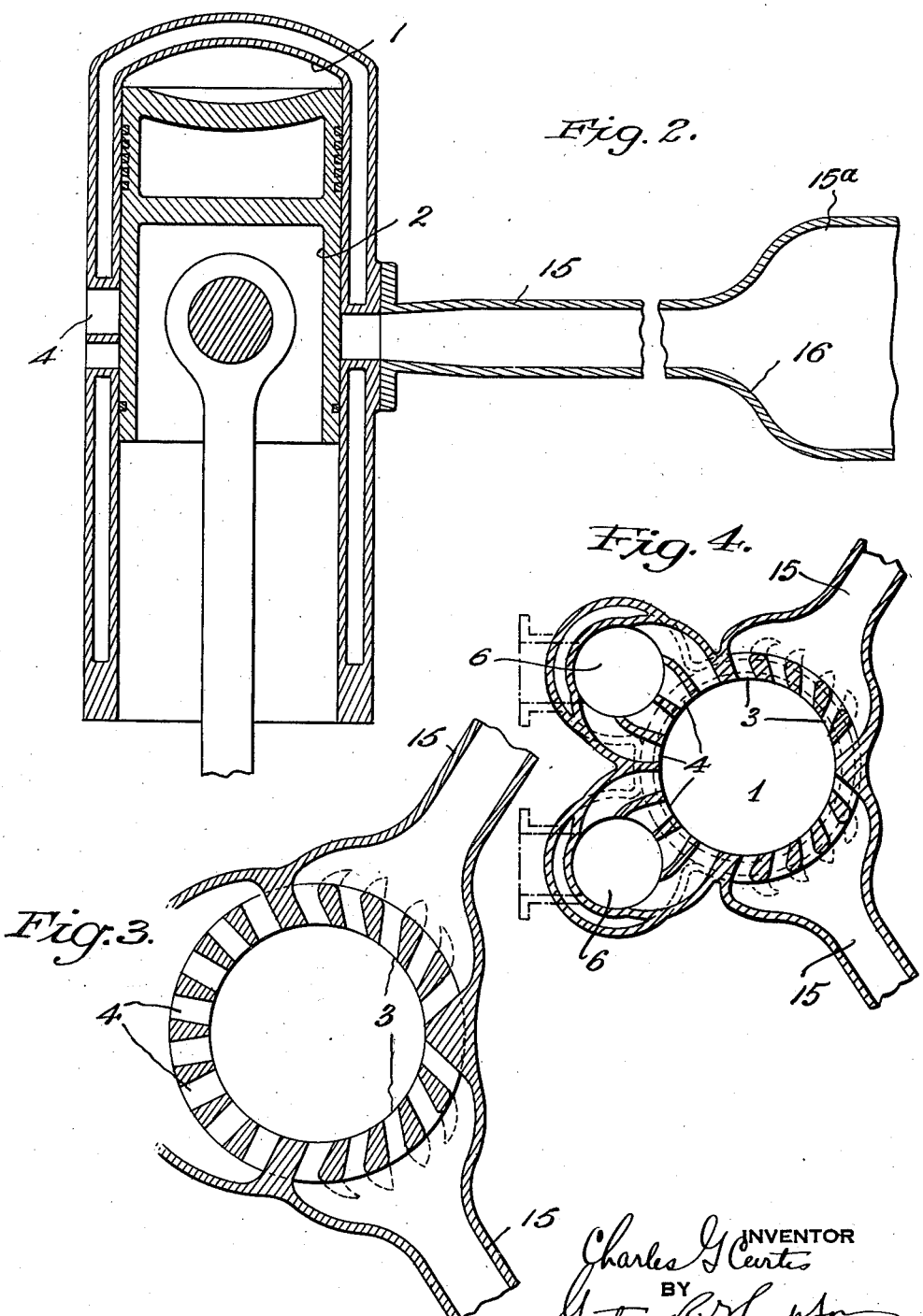

Patented Sept. 22, 1936

2,055,338

UNITED STATES PATENT OFFICE 2,055,338

TWO-CYCLE INTERNAL COMBUSTION ENGINE

Charles G. Curtis, New York, N. Y., assignor to Curtis Gas Engine Corporation, New York, N. Y., a corporation of New York Application April 14, 1931, Serial No. 529,900

5 Claims. (Cl. 123—65)

The object of this invention is to provide a two-cycle Diesel or gas engine which shall be capable of operating at a materially higher mean effective pressure than heretofore, which shall have a high thermal efficiency and which can be operated at comparatively high speeds of revolution. Many efforts have heretofore been made to secure this result but they have lacked the essential features necessary to success. I have found that in order to obtain a good fuel economy it is necessary to have a high scavenging efficiency. Good scavenging efficiency is also necessary if the engine is to be run at high speed.

In order to operate at mean effective pressures comparable to those had in four-cycle engines, it is necessary to provide some means of introducing or trapping in the cylinder a greater weight of air than is ordinarily had in port-scavenged two cycle engines, and I have found that, by the use of an exhaust valve properly arranged to close at the right point on the return stroke and to cooperate properly with the inlet ports, a very greatly increased amount of air may be trapped in the cylinder, so that much more fuel can be burned and more power developed with a given size cylinder. I have found with actual engines that by combining with such an exhaust valve a system of scavenging which requires a comparatively small amount of scavenging air, the time for scavenging can be shortened and the length of the effective compression stroke increased materially, or the speed of the engine can be increased.

I have also found that by admitting air to the cylinder from a source of compressed air through a pipe or passage of a length adapted to form a mass or column of air of substantial length and of a cross-section adapted to impart to the column which flows therein, considerable velocity, and by closing the exhaust at a proper time relative to the stopping of this admission that a super pressure over and above the pressure of the supply air can be established in the cylinder; thus materially reducing the work of compression for obtaining a given pressure of air-charge in the cylinder, or, for a given air-supply pressure, further increasing the amount of air trapped in the cylinder, permitting more fuel to be burned and increasing the amount of power that can be satisfactorily developed by the engine.

Two embodiments of the invention are shown in the accompanying drawings, wherein:

Fig. 2 is a sectional elevation of a single acting engine cylinder showing one or more air conduits for supplying air to the inlet ports so as to secure the inertia effect of an air column.

Fig. 3 is a horizontal sectional view through the ports showing the inlet ports divided into two banks, each one fed by an air supply conduit or pipe.

Fig. 4 is a horizontal sectional view of an engine cylinder through the inlet and exhaust ports showing exhaust valves and two sets of inlet ports.

Figure 1:
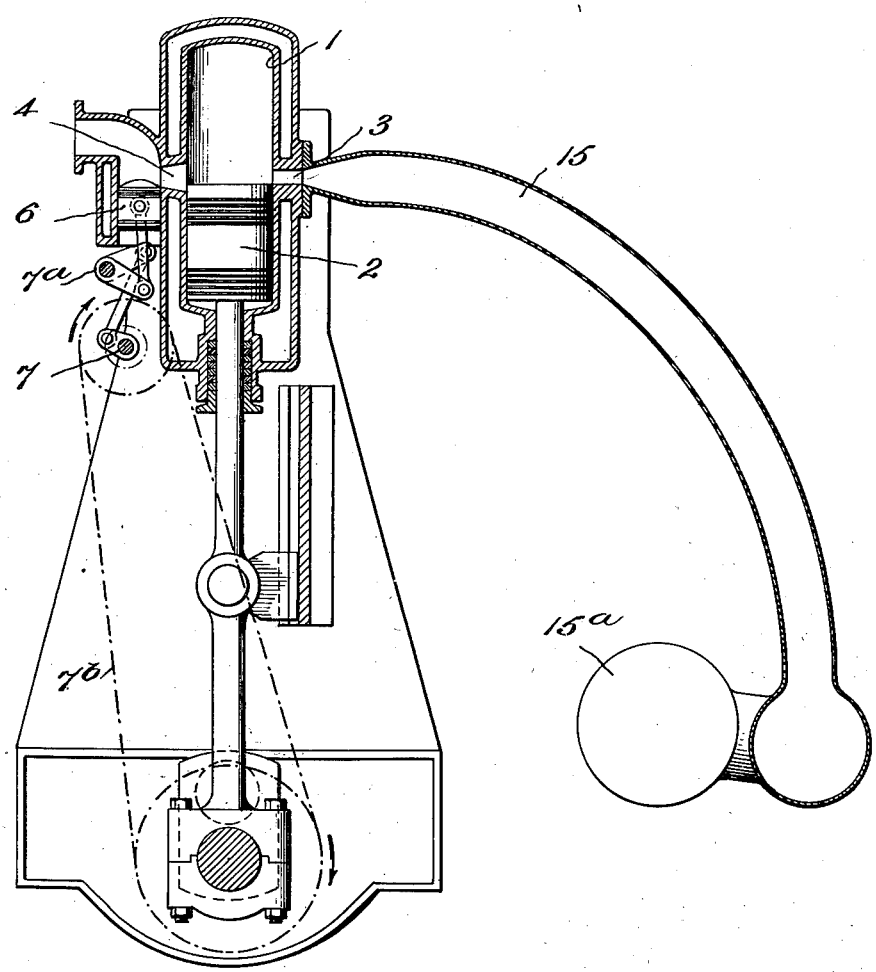
Fig. 1 is a sectional elevation of a double acting engine showing the application of a column of air operating to supercharge the cylinder by the inertia of the air column, and a means of closing the exhaust while the inlet remains open.

In Figure 1 numeral 1 represents the cylinder and 2 the piston of a two-cycle Diesel engine cylinder in the double acting form, 3 represents the inlet ports, and 4 the exhaust ports. The exhaust ports 4 extend above the level of the inlet ports sufficiently to drop the scavenging pressure before the edge of the piston reaches the top of the inlet ports. A valve 6 in the form of a piston valve operated by a crankshaft 7 and a bell crank 7a and suitable connecting rods, is provided for controlling the exhaust ports 4. The crankshaft driving piston valve 6 is timed so that the valve 6 is open when the engine piston 2 uncovers the exhaust ports 4 and closes on the return stroke somewhat before or about the point where the engine piston shuts off the inlet ports. This accomplishes two things: It causes the pressure in the cylinder 1 to rise above what it would otherwise be when the inlet ports close, thus giving what might be called a supercharge, and it serves to start the compression, which would not normally start until the exhaust ports 4 are covered by the engine piston, at a lower point in the stroke, with the result that a very greatly increased amount of air is trapped in the cylinder, and therefore a larger amount of fuel can be burned and the mean effective pressure materially increased. The crank operating the piston valve 6 is shown with a throw about twice as great as the height of the exhaust passage so that the closing of the valve 6 takes place in a comparatively short arc of revolution—about 50 or 60° and in a comparatively short time. By increasing the valve piston stroke still more relative to the height of the exhaust port the valve 6 could be made to close still more quickly. The height of the inlet ports 3 is fixed by the area required to get the air in within the time allowed and by the width of port available, and the exhaust valve must be closed early enough with reference to the closing of the inlet port so as to give time for the air to flow in and raise the pressure in the cylinder as nearly as practicable to that of the air pressure. It is important, however, I have found that the exhaust valve be not closed any earlier than is necessary to effect the desired supercharge, otherwise it encroaches on the scavenging period and shortens the time available for scavenging. The important thing is to start closing the exhaust valve as late as possible and get it closed early enough to ensure the maximum supercharge.

By making the actual stroke of the valve 6 great enough compared with what might be called the effective stroke of the valve, that is the port height, I have found that the valve can be made to close very quickly and thus interfere with the scavenging to the minimum extent.

For a double-acting engine I cause the crankshaft 7 of the valve to be run at double the speed of the main crankshaft by a gearing or by a chain drive 7b as shown. This accomplishes two things: It enables the same valve to shut off the exhaust on both ends of the cylinder alternately and at the same time it causes the valve 6 to close the ports 4 in half the time, that is twice as quickly as it would if its crankshaft 7 operated at the same speed as the main crankshaft. This arrangement involving also the bell crank motion multiplier gives an extremely rapid closing of the exhaust valve so as to interfere only very slightly with the scavenging.

Fig. 1 also shows the application of a new principle which I have devised for supercharging or increasing the amount of supercharge that can be obtained with a given air supply pressure, or for materially reducing the work of compression for obtaining a given pressure of air-charge in the cylinder. For example, with a given air-supply pressure I am enabled to obtain a higher pressure in the engine cylinder 1. In this arrangement I conduct the air to the inlet ports 3 through a pipe or passage 15, the area of which is reduced below the usual practice and the length of which is made such that a velocity of material amount is developed in this pipe or passage, thus forming a column of compressed air of a substantial or considerable length moving towards the inlet ports with a substantial or considerable velocity. When the exhaust valve 6 is closed quickly (before the inlet port 3 closes), this column of compressed air forms an inertia column which tends to drive the air into the cylinder through the ports 3 and raises the pressure in the cylinder 1 above the air supply pressure in the receiver 15a.

In Figs. 2 and 3 the passage or pipe leading into the inlet ports is made in two parts, and the area and length of each passage 15 between the inlet ports 3 and a compressed air receiver 15a is made just sufficient to develop the required velocity.

In Fig. 3 I have shown the passages 15 leading into the sets of inlet ports through an air belt, the cross-section of which is made substantially constant and equal to or slightly greater than the combined cross sectional area of the ports. Under these conditions the velocity would be maintained practically constant clear through the air belt and the ports themselves. In other words, there would be little or no pressure drop through the ports.

In order to cause the air to enter the ports 3 with as little resistance or as little eddies as possible the entering edges of the ports should be turned out into the air belt as shown in the dotted lines Fig. 4, thus maintaining a more uniform area at all points of the passage. The air, however, will of itself to a considerable extent divide and form little air columns jetting out somewhat of the shape shown. The air should enter the inlet passage 15 by a bell-mouthed entrance 16 leading from the air supply or manifold 15a so as to turn the pressure into velocity in the most efficient way. In practice it may be desirable to develop a certain amount of velocity in the passage 15 and additional velocity where the air enters the inlet ports. In this case the area of the passage 15 should be greater than the combined area of the inlet ports which it serves, some of the pressure drop taking place at the bell-mouthed entrance 16 and some taking place at the bell-mouthed entrance to the inlet ports. If it be desirable to have a large air belt, and particularly if the air belt is to be in one division, part of the pressure drop had better take place in the passage 15 and part in the inlet ports. With this arrangement when the piston 2 cuts off the inlet ports 3 the pressure will rise in the air belt due to the inertia column and this increased pressure will cause an increased flow into the cylinder as the inlet ports 3 are closing. The use of a double pressure drop will involve a little higher supply pressure.

In Fig. 1 I have shown the inertia column made in the form of a long curved pipe leading down to a manifold 15a supplying air at the required pressure. When the valve piston 6 closes the exhaust ports 4 this long column of air develops a considerable rise of pressure within the cylinder. I have found, for example by actual experiment, that when working with a supply pressure of 2 lbs. and with an inertia air column a few feet in length that if the exhaust be closed fairly quickly the pressure in the cylinder will rise to as much as three or four pounds above the supply pressure.
In other words, a supercharge amounting to several pounds can be obtained in this way. As a supercharge of 2 lbs. represents an increase of power capacity in the engine of at least 15 percent, it is evident that the matter of obtaining a supercharge is of great importance.

I have discovered that two things heretofore not combined are essential to make the two cycle engine a practical success: that is to make it equal or superior to the four cycle engine in commercial practice, particularly where high revolutions are desirable. One of these essentials is to introduce or trap in the cylinder a materially increased amount of air for combustion so that more fuel can be burned and the mean effective pressure increased. The other essential is to reduce to a great degree the amount of air required for efficient scavenging. By combining these two features, it becomes possible to operate a two-cycle engine at a much higher speed than heretofore and with a higher mean effective pressure, and still obtain good combustion and freedom from smoke at high revolutions and with a reasonable height of inlet and exhaust ports.

The time of scavenging is limited and the effect of an exhaust valve, even when operating very quickly, is to shorten to a material extent the time of scavenging. The only way to meet this condition is to reduce the amount of air necessary for satisfactory scavenging. With an exhaust valve in use, compression starts at the top of the inlet port and it is desirable to have this as low as possible in order to have a large compression stroke. If the inlet port is made low, it means a comparatively small area of inlet port and a small arc of scavenging, and if the engine is to be run at high speed, the exhaust valve must be made to close in a very short period of time otherwise the latter portion of the scavenging period is more or less impaired.

What is claimed is:

1. A two-cycle internal combustion engine, comprising a cylinder and piston, means for furnishing compressed air to said cylinder comprising a source of compressed air, an inlet to said cylinder and a pipe or passage leading from said source of compressed air to said inlet of a length adapted to form a mass or column of air of substantial length, and of a cross-section adapted to impart to the column which flows therein, when said inlet is open, substantial velocity, an exhaust passage, and means for closing said exhaust passage before said inlet is closed so that velocity of the aforesaid flowing mass or column of air created in said pipe or passage is converted into pressure within the cylinder to produce a super-charge.

2. A two-cycle internal combustion engine, comprising a cylinder and piston, means for furnishing compressed air to said cylinder comprising a source of compressed air, an inlet to said cylinder and a pipe or passage leading from said source of compressed air to said inlet of a length adapted to form a mass or column of air of substantial length, and of a cross-section adapted to impart to the column which flows therein, when said inlet is open, substantial velocity, an exhaust passage, and means for closing said exhaust passage before said inlet is closed so that velocity of the aforesaid flowing mass or column of air created in said pipe or passage is converted into pressure within the cylinder to produce a supercharge, said means for closing said exhaust passage comprising an exhaust-valve.

3. A two-cycle internal combustion engine, comprising a cylinder and piston, means for furnishing compressed air to said cylinder comprising a source of compressed air, an inlet to said cylinder and a pipe or passage leading from said source of compressed air to said inlet of a length adapted to form a mass or column of air of substantial length, and of a cross-section adapted to impart to the column which flows therein, when said inlet is open, substantial velocity, an exhaust passage, and means for closing said exhaust passage before said inlet is closed so that velocity of the aforesaid flowing mass or column of air created in said pipe or passage is converted into pressure within the cylinder to produce a super-charge, said air-inlet and said exhaust-passage opening into said cylinder near its expansion end.

4. A two-cycle internal combustion engine, comprising a cylinder and piston, means for furnishing compressed air to said cylinder comprising a source of compressed air, an inlet to said cylinder and a pipe or passage leading from said source of compressed air to said inlet of a length adapted to form a mass or column of air of substantial length, and of a cross-section adapted to impart to the column which flows therein, when said inlet is open, substantial velocity, an exhaust passage, and means for closing said exhaust passage before said inlet is closed so that velocity of the aforesaid flowing mass or column of air created in said pipe or passage is converted into pressure within the cylinder to produce a super-charge, said air-inlet and said exhaust-passage opening into said cylinder near its expansion-end, and said air-inlet comprising a plurality of ports disposed around an arc of the cylinder circumference, the ports in the end portions of said arc being directed back toward the inlet side of the cylinder.

5. In a two-cycle internal combustion engine, inlet scavenging ports on one side of the cylinder arranged to open by the movement of the piston near the end of its stroke, exhaust ports also arranged to open by the movement sufficiently in advance of the inlet ports to cause the cylinder pressure to drop to a point where scavenging can begin, a source of compressed air, and means for furnishing compressed air from said source to said cylinder comprising a pipe or passage leading to said inlet-ports of a length adapted to form a mass or column of air of substantial length and of a cross-section adapted to impart to the column which flows therein, when said inlet ports are open, substantial velocity, an exhaust valve for shutting off the exhaust passage at such a point with reference to the closing of the inlet ports by the piston as will give the maximum pressure in the cylinder at the time the inlet ports close, the velocity of the aforesaid flowing mass or column of air created in said pipe or passage, upon the closing of the exhaust being converted into pressure within the cylinder to produce a supercharge.

CHARLES G. CURTIS.